June 30, 1964 I. R. STOCK 3,139,404
FILTER STRUCTURE
Filed Feb. 10, 1961
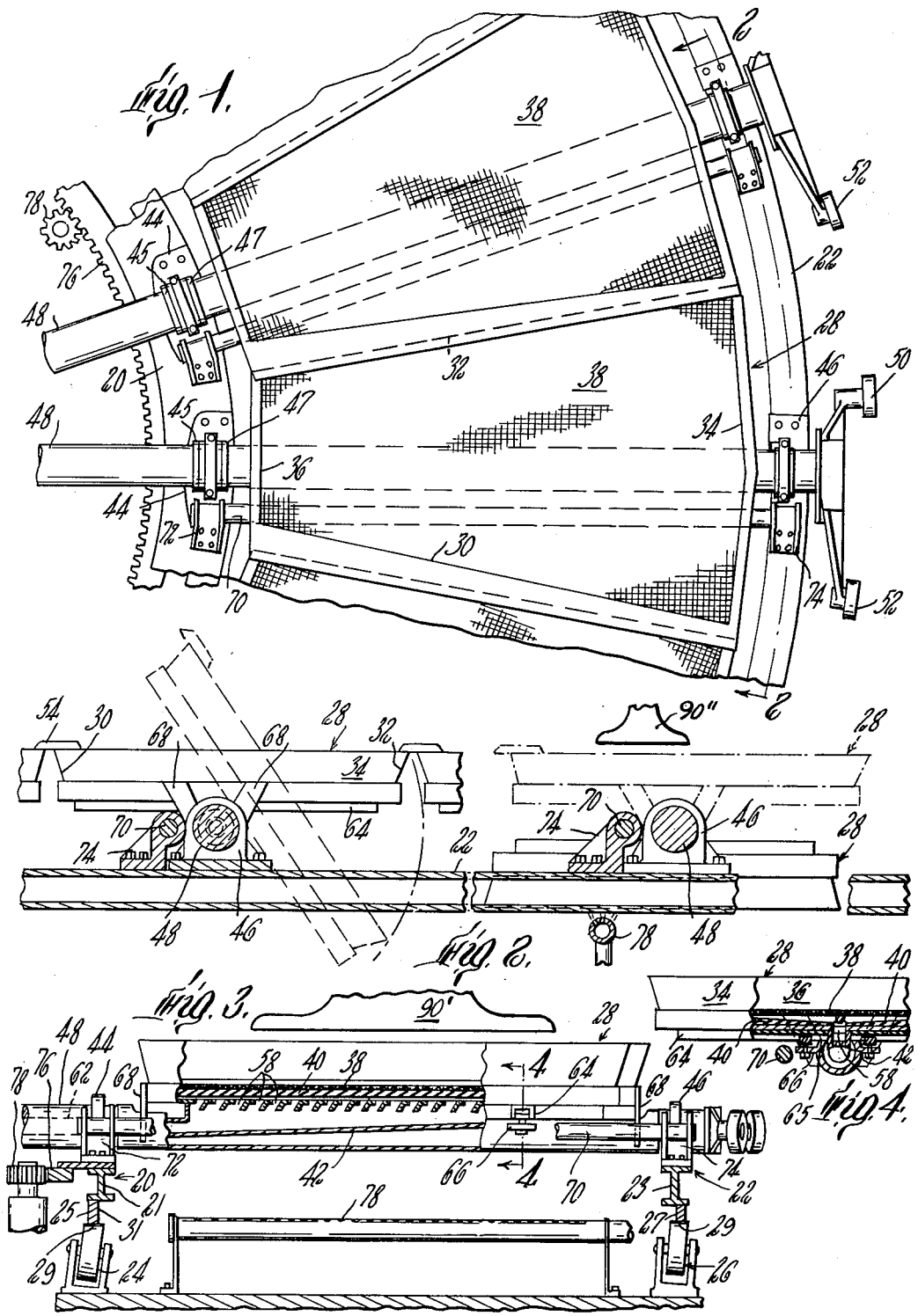

United States Patent Office 3,139,404
Patented June 30, 1964

3,139,404
FILTER STRUCTURE
Irwin R. Stock, East Walpole, Mass., assignor to Bird Machine Company, South Walpole, Mass., a corporation of Massachusetts
Filed Feb. 10, 1961, Ser. No. 88,386
4 Claims. (Cl. 210—232)

This invention relates to large horizontal rotary filter structures and the like and more specifically to an improvement in the form and arrangement of their parts which permits cleaner and more efficient operation and achieves savings in fabrication and maintenance.

In filters to which this invention generally relates, a multiplicity of filter cells, each comprising a pan and a horizontally disposed filter medium, are supported in circular array for charging, draining and washing. Each cell is overturned at the end of each filtering cycle for discharge of filter cake.

A rotary filter of a particularly desirable type which the invention particularly concerns is the pivotal cell filter in which each cell is mounted for pivotal inversion about an axis which extends generally radially from the center of the array. This arrangement permits advantageous location of the numerous stations past which the cells rotate, and inversion and return of the cells is easily effected as with a controlling cam track.

A principal objective of this invention is to provide a more efficient rotary filter of this pivotal cell type and particularly to maximize its filtering capacity while minimizing the costs of fabrication and maintenance.

Filters are employed in chemical processes where the filtrate and filter cake may be highly corrosive. It is another objective of the invention to provide a very clean operating filter in which filter cake is cleared from the cells and deposited without carry-over at the discharge point, and in which splashing of the materials involved is avoided.

In the pivotal cell rotary filters inner and outer circular car frame elements are secured together and the cells are pivotally mounted between these elements. Members joining the circular frames not only serve to accurately rigidly position the circular frame elements in concentricity, but also transmit driving torque between the two to obtain bodily rotary movement of the structure, whereby alignment of the opposed pivot journals of each cell is ensured.

Desirably such strengthening spanning members would be located in the plane of the cells. However, if they are located between the adjacent cell sides with clearance allowance for cell pivoting, the additional space they occupy would reduce the area of the annulus available for filter cells, and so reduce the effective filter area and filter output substantially. Unless clearance space is provided which permits substantially complete inversion of the cells, full discharge of filter cake and thorough cleansing of the filter medium are interfered with.

Consequently, it has been the practice to join the two circular car frame elements through a series of radial structural spanning members extending between the circular frame elements at a position spaced far below the cells, which gives clearance for the cells when they are pivoted for inversion. While this has permitted cells in the array to be close together, without spanning members occupying valuable space in the annulus of array, this has required a substantial amount of heavy structural material to give the high profile, affecting the expense of fabrication and the wearing of various elements and requiring high powered drive machinery. Moreover, a problem with such arrangements has been that the structural spanning members have been exposed to filter cake discharged from adjacent cells, and such cake has tended to build up as objectionable large masses which have been carried beyond the discharge station, the spanning members being also exposed to deleterious action of chemicals being filtered. Yet another objection has been that the stationary water jet pipes for dislodging the filter cake and cleansing the filter medium have been required to be spaced substantially below the overturned cell level to allow for passage of the rigid spanning members as the filter structure rotated. As the effectiveness of a jet diminishes rapidly with the vertical spacing between orifice and filter medium, it has not been possible to obtain optimum use of water jet equipment, and either an over-design of jet capacity or a sacrifice in the cleansing of the filter medium has been necessary.

In one pivotal cell design which has been extensively employed, a longitudinal journal shaft for each cell provides the journal portions at the opposite cell ends, and cell bottom brace structure has heretofore extended outwards from the sides of the journal to give support to the cell pan. In one such construction, the journal shafts have also been employed for rigidly joining and positioning the two car frame elements. For this, four accurately machined flanges per cell, a pair at each end of each journal shaft, have been required to engage corresponding thrust bearings on the inner and outer frame elements. Because the tangential driving forces are transmitted between the concentric circular frame elements through the journal shafts, it has been necessary to pivotally support the journal shaft of each cell in four bushings, a spaced-apart pair at each end of the cell to prevent bending of the shaft, and consequent binding of the pivotal cell. Provision of the accurately machined journal positioning flanges and the numerous bearings and their greasings affect substantially the expenses of fabrication and maintenance. Furthermore, the cells with their shafts in this design cannot be easily removed or adjusted as care must be taken to maintain the concentric relationship of the circular elements.

It is a principal objective of this invention to provide an improved rotary filter assembly in which the difficulties and disadvantages of the above constructions have been overcome.

Particular objectives of the invention are to minimize the mass of structural materials employed in a rotary filter of any given capacity, and the number of machined parts; to provide for clean filter operation; to achieve simplicity of maintenance; to obtain efficient use of water jet apparatus; and to maximize the effective filter medium area.

In the drawings, which illustrate a preferred embodiment of the invention:

FIG. 1 is a plan view of a part of a rotary filter showing two of its filter cells in circular array;

FIG. 2 is a vertical, partially broken away section on arcuate line 2—2 of FIG. 1 illustrating some of the filter cell positions during a cycle of filter operation;

FIG. 3 is a partially sectional and partially elevational longitudinal side view; and FIG. 4 is a vertical section, transverse to the longitudinal axis of the cell of FIG. 3 on line 4—4 thereof.

The invention particularly concerns the combination of filter cells and rigid spanning members of special form, disposed in a unique relationship to each other and to the car frame elements.

Referring to the drawings, in the preferred embodiment the rotary filter comprises inner and outer circular car frame elements 20, 22 mounted upon roller assemblies 24, 26 (FIG. 3) for rotary movement through the various stations. In this embodiment each of the car frame elements 20, 22 comprises a circular structural beam member 21, 23 and a bearing member 25, 27 joined thereto, providing an undersurface 29 for engagement on supporting rollers. Inner element 20 provides a rim surface 31 for engagement with spaced-apart casters (not shown) for centering.

An internal gear 76 is joined to the inner element 20 and a pinion 78 meshed therewith, drives the rotary filter apparatus.

A multiplicity of filter cells 28 are closely arrayed in a circular series, each cell extending between the circular frame elements. Each cell is preferably of a generally isosceles trapezoidal design, having side walls 30, 32, end walls 34, 36, all flared outwardly to permit filter cake drop-out, a sheet form filter medium 38 disposed over a support 40, and a filtrate collector 42. Bearing pedestals 44 and 46 are mounted at opposite ends of each filter cell upon corresponding car frame elements 20, 22, and a longitudinal cell journal shaft 48 extends the length of each cell and is pivotally supported by the pedestals on an axis well above the car frame elements. As seen in FIG. 1, the shaft 48 at the inner bearing 44 has spaced-apart, raised flange portions 45 and 47 engaging opposite sides of the bearing, positioning the cell endwise relative to the inner frame element. At its outer end, at bearing 46, the shaft is smooth, no locking being required. Roller cams 50, 52 are mounted on the outer end of the shaft, extending over the outer car frame element for engagement with a tilt control cam path, not shown, which overturns the cell for discharge of filter cake by rotating them through approximately 180° about their axes, and then restores them to filtering position by reverse rotation. Referring to FIG. 2, each cell is provided with a drip guard 54 overlapping one adjacent cell, and each cell is adapted to overturn towards the adjacent cell on the other side. The shaft 48 is asymmetrically disposed towards the drip guard side of the filter cell, providing clearance of the drip guard with the adjacent cell past which it swings.

Referring to the curved dotted line in FIG. 2, indicating the arcuate path of a cell as it pivots between its filtering position and a tilted position, there is very close clearance between adjacent cells, here on the order of ½ inch. Because the swing path of the filter side approaches more closely a vertical line at outer portions of the side than at the inner portions, the outer portion of adjacent cells in their filtering positions are advantageously placed closer than the inner portions as seen in FIG. 1, thus maintaining an adequate clearance with the top of each cell and the bottom of the adjacent cell throughout its length while obtaining a maximum of effective filter medium.

Referring to FIGS. 3 and 4, each cell preferably has a gently sloped transverse liquid draining bottom in receiving communication with the filter medium 38, preferably emptying through a central, longitudinal series of openings 58 into a longitudinal collector 42 disposed below the openings, inside the journal shaft. The collector bottom slopes to the inner shaft end where it is connected to drain piping 62 which extends inwards, over the inner car frame element to drain apparatus, not shown.

Spaced-apart, transverse supporting channels 64 secured to the cell rest upon the upper part of the journal shaft at 65, and are secured to lugs 66 welded to the sides of the shaft for rigid support. The ends of the cell are braced directly to the shaft by generally upright struts 68.

It is important to note the relation of the cell, its supporting structure, the journal shaft, and the car frame elements. With the cell in filtering position, the cell drain bottom is disposed substantially above the pivot axis of the cell, and the cell supporting structure defines a substantial, longitudinal, unblocked space directly below the cell bottom, alongside the longitudinal shaft, extending throughout the cell length on the side of the axis opposite from that towards which the cell overturns.

A radial structural spanning member 70, here comprising a rigid cylindrical steel pipe of a diameter less than that of the journal shaft is disposed in this space, generally parallel to the journal shaft and on a level generally corresponding to that of the axis of the shaft. This member is rigidly joined at its opposite ends to the corresponding circular car frame elements 20 and 22 through rigid supports 72, 74, each of which extends upwards from its car frame element. A multiplicity of the rigid spanning members 70, each corresponding with a filter cell, are spaced around the structure to position and rigidly join together the inner and outer circular frame elements. With this arrangement, the circular elements and the cells provide a low profile structure in which the maximum of filter medium can be presented by the side-by-side cells, in a simple and inexpensive structure.

Also, a substantial, longitudinal, unblocked space extending along the opposite side of the longitudinal shaft (the side towards which the cell overturns) preferably is defined by the cell structure, which space registers with the rigid spanning member 70 when the cell is overturned so that complete cell inversion is possible. As will be seen in the right hand portion of FIG. 2, one side of the understructure of a cell in filtering position (shown in dotted lines) lies above the rigid spanning member, and in inverted position, the other side of the understructure lies below this member.

A series of rubber bumpers or the like can be secured to the undersurface of the spanning member or to the registering portion of the overturned cell, and the cell may be allowed to bump against the rigid member once or repeatedly during discharge to dislodge filter cake from the filter medium.

A water jet pipe 78 is mounted below the filter apparatus, spaced slightly below the lowest plane of the cells when overturned, extending between the two circular elements, and connected to a source of pressurized water, not shown, providing a very short spray distance permitting efficient cleansing by the jets.

It will be noted in this arrangement a very compact apparatus is achieved, the filter cell pan top in its filtering and overturned positions defining the zone occupied by the rotary filter between the circular frame elements during operation. The rigid spanning elements while being separate from the cells, lie within the projected cylinder of revolution thereof. As filter cells of the type here involved have diameters of as much as 25 feet or more and weights in the range of 100,000 pounds, it is evident that the apparatus disclosed above offers substantial economies over the prior art with regard to structural materials required.

Since there is no structure extending above the cells in their filtering position, the charging 90' and washing 90" outlets are disposed immediately above the rotating cells. Thus, the liquids are introduced into the cells in a gentle flow, and splashing of corrosive liquids and solids is avoided.

In conclusion, it will be appreciated that objects of the invention are achieved where the rigid spanning members are provided, for instance, with every second cell in the array, so that a spanning member is not required with each cell. The size of each rigid spanning member may be decreased by directly imparting some driving forces to each car frame element, so that the spanning members, while transmitting torque for equalization to move the elements bodily together, need not transmit all of the forces needed for driving.

Various of the other specific details of the preferred embodiments can be varied within the spirit and scope of the invention.

What is claimed is:

1. A rotary filter apparatus comprising a multiplicity of filter cells having understructures and horizontally disposed in a circular array, inner and outer circular car frame elements, each cell extending between and pivotally mounted on longitudinal shaft means to said car frame elements to tilt about the longitudinal axis of the cell from a filtering position to a discharge position, means for tilting said cells, the inner and outer car frame elements being connected together, the entire structure being mounted to rotate, and means for applying driving forces to at least one of said car frame elements to rotate said structure, characterized in that the car frame elements are rigidly connected by a plurality of rigid spanning members each rigidly fixed to said car frame elements and disposed adjacent the longitudinal axis of a cell at the side thereof which trails when the cell pivots for tilting to said discharge position, the spanning members and the understructure of said cells being cooperatively constructed and arranged positioning each spanning member beneath the trailing side of its respective cell when said cell is in filtering position and is directly above the understructure of the leading side of the cell when the cell is in discharge position.

2. The rotary filter of claim 1 wherein each said shaft means extends the full length of its respective cell, and said spanning member has a vertical dimension less than said shaft means and is generally horizontally aligned with and positioned close to said shaft means providing clearance for substantially 180° movement of said cell.

3. The rotary filter of claim 1 wherein a stationary water jet means is disposed immediately below the cell in its discharge position.

4. The rotary filter of claim 1 wherein each filter cell corresponding with a rigid spanning member comprises a pan providing a fluid draining bottom, and wherein each said shaft means extends the full length of its respective cell, and cell support and bracing means rigidly joining the pan to said shaft means while leaving unobstructed a longitudinal space adjacent said shaft means at least close to the horizontal plane through the axis of said shaft means on the side of said shaft means which trails when the cell pivots for tilting to said discharge position, in which space said rigid spanning member is disposed.

References Cited in the file of this patent

UNITED STATES PATENTS

| | | |
|---|---|---|
| 938,378 | Grothe et al. | Oct. 26, 1909 |
| 985,611 | Lynch | Feb. 28, 1911 |
| 2,853,193 | Crumb | Sept. 23, 1958 |
| 2,997,068 | Roos | Aug. 22, 1961 |

FOREIGN PATENTS

| | | |
|---|---|---|
| 297,394 | Great Britain | Apr. 11, 1929 |
| 700,740 | Great Britain | Dec. 9, 1953 |